March 5, 1968  H. GINTOVT  3,371,410
FORMING AND DISPOSING INTEGRALLY CONNECTED
CONDUCTORS IN ROTOR CORE SLOTS
Filed Jan. 12, 1965  2 Sheets-Sheet 1
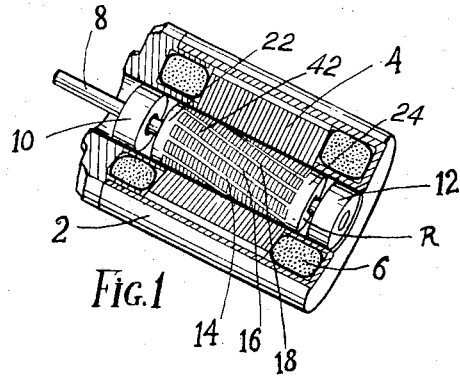
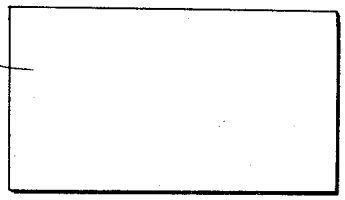
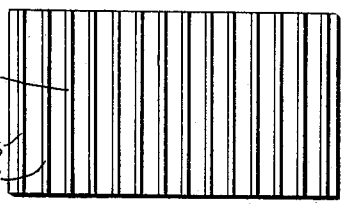
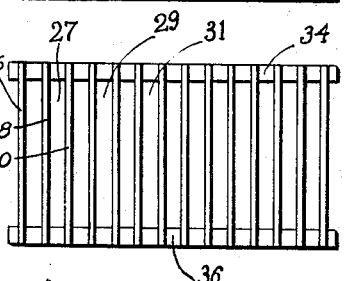
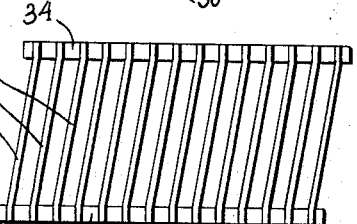
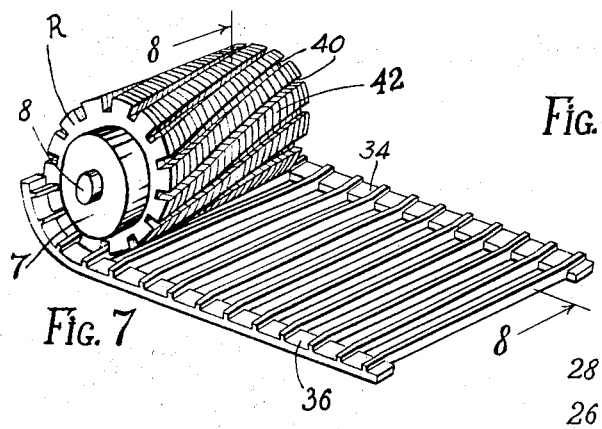
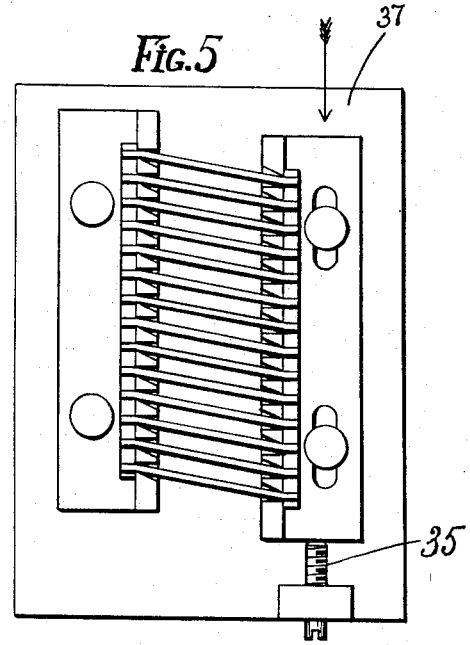
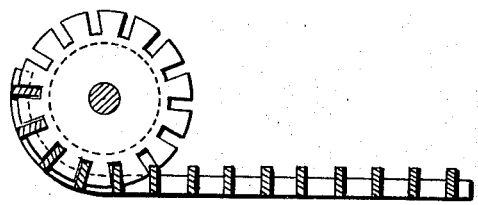
INVENTOR.
BY Henry Gintovt

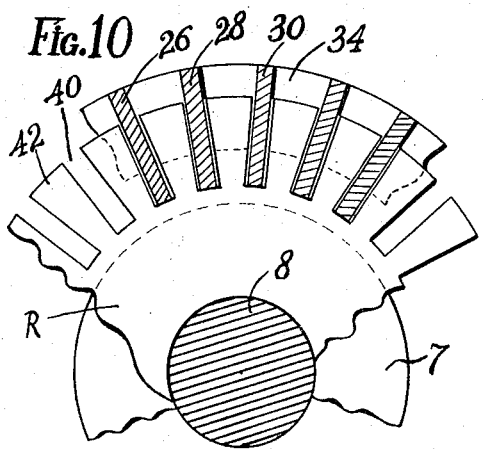
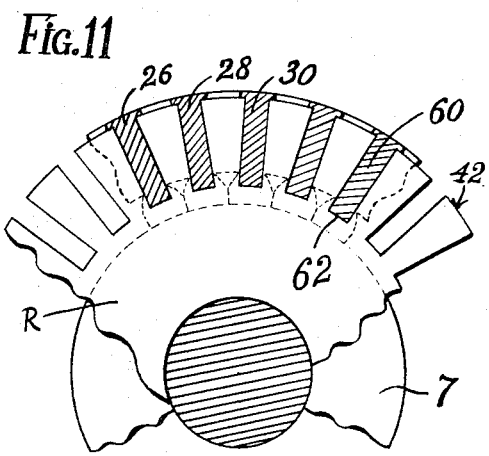
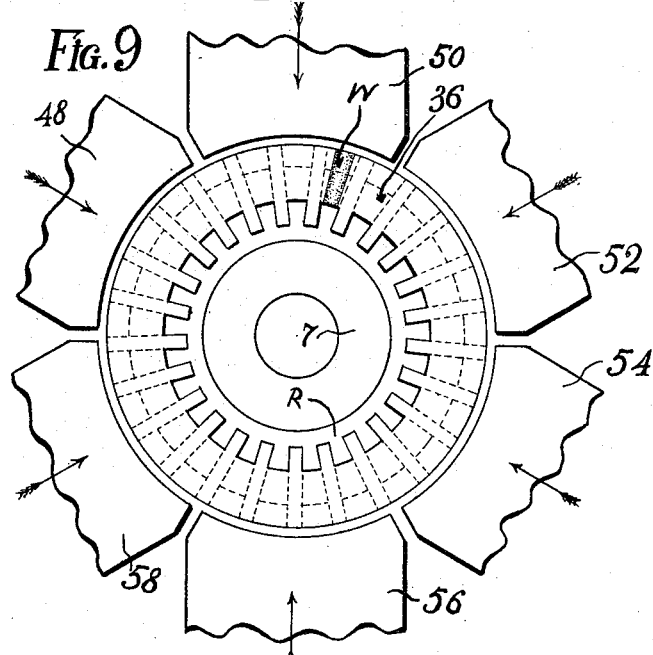
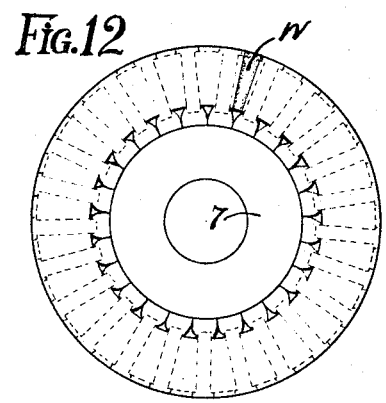
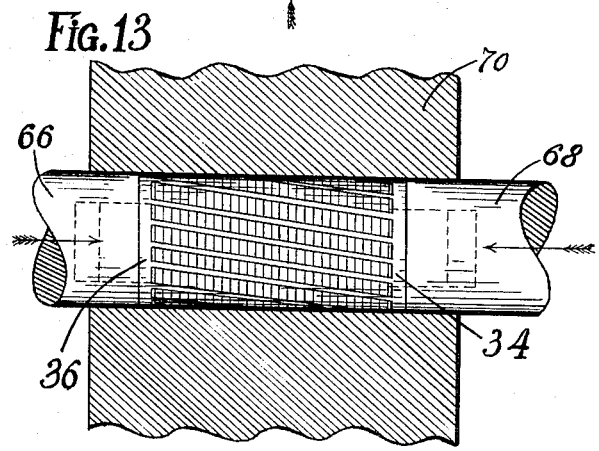
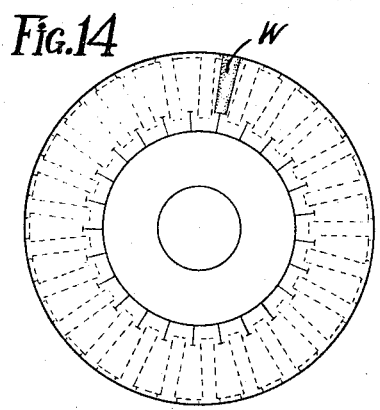

United States Patent Office 3,371,410
Patented Mar. 5, 1968

3,371,410
FORMING AND DISPOSING INTEGRALLY CONNECTED CONDUCTORS IN ROTOR CORE SLOTS
Henry Gintovt, 14 Hamilton St., Dover, N.H. 03820
Continuation-in-part of application Ser. No. 328,786, Dec. 2, 1963. This application Jan. 12, 1965, Ser. No. 425,015
5 Claims. (Cl. 29—598)

ABSTRACT OF THE DISCLOSURE

Squirrel cage type secondary windings for induction motor rotors are formed from an improved sheet metal type secondary winding material to provide a secondary winding shell having conductor bar elements of a thickness greater than the depth of helical slots in a rotor body and whose end ring sections have outer edges spaced apart a greater distance than the axial length of the rotor. The secondary winding shell thus formed is subjected to forces for displacing the conductor bars into skewed positions and compressed into the bottoms of helical slots of the rotor. Portions of the conductor bars are flowed into overlapping relationship with respect to opposite end faces of outermost laminations in the rotor body to provide a solidly interlocked relationship of parts.

---

This application is a continuation-in-part of application Ser. No. 328,786 filed Dec. 2, 1963, and now abandoned.

This invention relates to miniature precision induction motors and to an improved construction for inductor motor rotors of the squirrel cage class. Squirrel cage rotors comprise essentially a plurality of stacked rotor laminations with which is associated a secondary winding. The rotor laminations are formed with teeth or notches and are arranged so as to form slots which extend helically along the outer periphery of the rotor body. The secondary winding ordinarily consists of end ring sections and conductor bar elements extending between the end ring sections and received in the slots. The invention is especially concerned with an improved rotor and secondary winding structure as well as an improved method of combining the secondary winding in a desired relationship around the rotor body.

It has been well known for many years as disclosed in Patent No. 1,597,666 issued in 1926 to Barr to combine a sheet metal secondary winding with a helically slotted rotor. However, electrical conductivity of devices made in this manner is found to be unsatisfactory. As a result it has been proposed more recently in Patent No. 2,998,-638 to MacLaren to avoid the difficulty of the disclosed sheet metal type winding by casting a metal such as aluminum. This casting method also has led to further difficulty arising out of the heat of the casting process as well as the tendency for gas occlusion to occur, and also the problem of maintaining uniform purity in the cast aluminum.

It is a chief object of the invention, therefore, to improve induction motors and especially to improve the manufacture of squirrel cage type secondary windings for induction motor rotors, and to eliminate or substantially reduce the difficulties noted above.

Another object of the invention is to provide an improved sheet metal type secondary winding which can be produced in the cold state to avoid any difficulty from overheating or high temperature exposure and which is applied to the slotted rotor in a manner such that all spaces in and around the rotor slots are completely filled and the winding and rotor become solidly interlocked with one another to resist displacement by centrifugal forces as well as to seal out oil and other foreign matter.

Still another object is to provide a secondary winding which is made with conductor bars having improved density characteristics and which will thereby provide better electrical conductivity.

It is also an object to obtain greater uniformity in metal fabrication so as to provide improved electrical performance of the rotor. Thus it is contemplated difficulties arising from non-uniformity in prior art rotors may be completely avoided and very substantial savings may be realized in connection with testing and manufacture on a commercial scale, especially in the manufacture of miniature, precision motors.

The nature of the invention and its objects and novel features will be more readily understood and appreciated from the following description of a preferred embodiment of the invention selected for purposes of illustration and shown in the accompanying drawings, in which:

FIGURE 1 is a cross sectional view taken centrally through the longitudinal axis of a miniature induction motor of the squirrel cage class and particularly illustrating the secondary winding component of the invention in a fully assembled state in combination with the rotor member of the motor;

FIGURES 2, 3 and 4 illustrate steps in a method of fabricating a sheet material to form a secondary winding shell in accordance with the invention;

FIGURE 5 is a diagrammatic view illustrating a method forming the material of FIGURE 4 with skewed conductor bars;

FIGURE 6 is a detail view showing the skewed material;

FIGURE 7 is a perspective view illustrating the step of rolling the prefabricated secondary winding shell of FIGURE 6 into interlocking relationship with the helical slots of a laminated rotor body;

FIGURE 8 is an end elevational view of the rotor body shown in FIGURE 7 and further illustrating the manner in which the prefabricated secondary winding shell is engaged in the helical slots of the rotor body;

FIGURE 9 is a diagrammatic view indicating the secondary winding shell completely rolled and its meeting ends welded together, and the figure further illustrates the secondary winding shell in position to undergo the step of exerting radially inwardly directed compressive forces so as to flow conductor bar metal inwardly;

FIGURE 10 is a fragmentary end elevational view partly in cross section showing the secondary winding shell located around the rotor body and indicating the conductor bar elements of the shell in a fully engaged position in the rotor slots with portions of the conductor bars projecting out of the slots before being subjected to compressive forces.

FIGURE 11 is a fragmentary detail view partly in cross section and further illustrating flowing of portions of the conductor bars after compressive forces have been exerted;

FIGURE 12 is an elevational view showing an end of a rotor and winding shell in a partly finished state after being compressed;

FIGURE 13 illustrates a further step of axially working the winding shell; and

FIGURE 14 illustrates in end elevation the fully finished rotor and secondary winding shell of the invention.

Considering in general the several operations illustrated in the figures noted, I start with a rotor body of well-known type made up of a plurality of toothed metal laminations arranged in stepped relationship to form a cylindrical body having helical slots spaced therearound.

In accordance with the invention, I select a sheet of electrically conductive material of a desired thickness and mechanically work the sheet of material to provide a secondary winding shell having dimensional values of a predetermined nature related to the dimensions of certain parts of the rotor body noted above. Specifically, I employ in a preferred embodiment of the method a sheet material of a thickness greater than the depth of the slots in the rotor member and I subject this sheet material to mechanical forming operations for providing a secondary winding shell having conductor bar elements of a thickness greater than the depth of the helical slots in the rotor body and with end ring sections whose opposite outer edges are spaced apart a distance greater than the axial length of the rotor.

The secondary winding shell thus formed is subjected to oppositely directed forces along the end ring sections to displace the conductor bars into desired skewed positions and thereafter I locate the skewed secondary winding shell about the rotor body with the conductor bars being forced into the bottoms of the helical slots of the rotor and projecting outwardly beyond the periphery of the rotor body, and with the end ring sections of the shell extending axially beyond the end faces of the cylindrical rotor body. At the point where the ends of the end ring sections meet, they are welded together as shown by the spot of welding W in FIGURES 9, 12 and 14. The shell is then subjected to forces which act on the projecting portions of the conductor bars to flow conductor bar metal into the slots and around the stepped edges of the toothed laminates, and also in overlapping relationship with respect to opposite end faces of the outermost laminations in the rotor body so as to completely fill and overlie the slots at all points. Thereafter, the axially projecting end ring sections are subjected to pressure to flow these end ring sections and adjacent conductor bar portions radially inwardly over the said end faces of the rotor thereby to provide a solidly interlocked relationship of parts.

Considering these operations in greater detail, there is illustrated in FIGURE 1 a common form of miniature inductor motor which includes an outer casing 2 in which is contained a stator 4 and coils 6 of conventional nature.

In accordance with the invention, I provide an improved rotor assembly which may be mounted in the stator 4 as shown in FIGURE 1. The rotor assembly includes a rotor body R of conventional nature consisting of a plurality of toothed laminations of metal, and a secondary winding shell which is formed and located around the rotor body in a novel manner. The toothed laminations are of well-known type and are arranged on a shaft 8 in stepped relationship to define a plurality of spaced helical slots 40 and intervening land surfaces 42 as may be better seen from an inspection of FIGURE 7. Bushings 7 are pressed onto both ends of the shaft 8 to keep rotor laminations in place while the secondary winding shell is being put on. These bushings are removed after the operation is completed.

In forming the secondary winding shell of the invention, a sheet of electrical conductor material S may preferably be chosen with reference to the dimensions of the rotor body R in a manner such that the thickness of the sheet S is greater than the depth of the helical slots 40 and the width of the sheet exceeds the axial length of the rotor body R by a predetermined amount. This sheet S having the dimensions noted, is first processed by suitable forming machinery to provide a series of partially formed conductor bars as 26, 28, 30, etc. spaced apart as indicated in FIGURE 3.

Thereafter a subsequent forming step is employed to stamp through the areas between the partially formed conductor bars and leaving only enough material to provide opposite end ring sections as 34 and 36 between which the conductor bars now completed extend in spaced relation as illustrated in FIGURE 4. It will be understood that a strip of the sheet metal thus fabricated may be employed in a length which corresponds to the outer circumference of the rotor body R. This selected length of material is further treated to provide an offset or skewed arrangement of the conductor bars so that they will readily coincide with and enter into the helical slots 40 when the strip S is placed around the rotor R. FIGURE 5 shows a preferred step of thus skewing the conductor bars as is further indicated in FIGURE 6. As noted therein a slide frame 37 engages the end ring sections and provides for oppositely directed forces being applied to offset the bars as shown. Adjusting screw 35 is provided to control a degree of skew.

In FIGURES 7 and 8, I have illustrated the fabricated secondary winding shell thus produced being located around the rotor body R by a step of rolling the rotor body as indicated diagrammatically in these figures.

In FIGURE 10 a portion of the rotor body R and the winding shell of the invention are shown on a somewhat larger scale. It will be observed that the conductor bars as 26, 28 and 30 are inserted all the way into the bottoms of the slots 40 and the bars are of a size such that they project out from the periphery of the rotor R for an appreciable distance. In FIGURE 9 an end of the ring section is shown with inwardly projecting conductor bar ends.

It will also be noted that the end ring sections 34 and 36 project beyond respective extremities of the rotor R as is more clearly shown in FIGURE 7. It is still further pointed out that the conductor bars, although being substantially of the same width as the width of slots 40, nevertheless do have a slight clearance between themselves and adjacent slot surfaces in order that they may enter into the slots readily. It will also be observed that the stepped relationship of the toothed laminations result in tiny offset spaces being present all along the slot sides.

In the method of the invention all of these clearances and spaces are required to be solidly filled by flowing excess conductor bar metal from the projecting conductor bar portions noted above by means of suitable mechanical working processes. FIGURES 9 and 10 show the assembly before compression. Considering first the operation indicated in FIGURES 9 and 10, I employ a plurality of hammering devices 48, 50, 52, 54, 56 and 58 which are arranged in opposed pairs to balance one another so that opposite peripheral sections of the shell are subjected to impact forces simultaneously. I may also utilize other compression devices.

The impact forces thus exerted on the outer peripheral portions of the secondary winding shell operate to flow intermediate projecting portions of the conductor bars into the spaces in respective helical slots thereby to completely fill all spaces and interstices therein and to compact the metal thus forced into the slots so that the density of the metal from an electrical conductivity standpoint is significantly increased. As the flow of metal occurs it will be apparent that some of the flowed metal from conductor bars 26, 28, 30 becomes displaced over onto adjacent land surfaces 42 as has been indicated diagrammatically in FIGURE 11.

It is pointed out that when the impact forces are exerted by the apparatus suggested in FIGURE 9 at those portions of the conductor bars which project beyond the ends of the rotor, they become flowed radially inwardly as shown in FIGURES 11 and 12 to extend beyond the bottoms of the helical slots until they meet the surface of the bushings 7. In FIGURE 11 completely filled slots are indicated by the reference character as 60 and the bottoms of the slots are denoted by numeral 62. This figure more clearly indicates the extent to which conductor bar extremities shown in dotted lines in FIGURE 11 are displaced inwardly beyond the bottoms of the slots so as to rest on the bushings 7. This forms the outermost conductor bar portions into wedge shaped parts which constitute the inner peripheries of the end ring sections.

The partially completed rotor shown in FIGURES 11 and 12 is thereafter subjected to another forming operation as indicated in FIGURE 13 in which compressive forces are exerted axially of the rotor body and directly against the projecting edges of the end ring sections 34 and 36, as well as the partly displaced conductor bar portions projecting inwardly therefrom. Numerals 66 and 68 denote cylindrical forming tools which together with a supporting structure 70 acts on the ring sections simultaneously to flow them radially inwardly. In their finally closed shape the formed parts occur as indicated in FIGURE 14.

Thereafter excess metal is removed from the land surface 42 by grinding or other mechanical working means and the rotor is then brought to a finished state.

It is pointed out that a number of desirable improvements are thus imparted to the rotor of the invention. The slots are completely filled in a manner that has not heretofore been accomplished in the art and the metal flowed into the slots under impact forces is characterized by a significantly increased density which adds importantly to the functioning of the rotor. The manner in which the end ring sections and adjacent conductor bar parts are forced radially inwardly beyond the bottom of the slots at the end faces of the rotor results in a solidly interlocked relationship of the shell and rotor body whereby centrifugal forces cannot act to displace the rotor bars and the tightly compacted relationship of the parts functions to seal out oil or other foreign material which might affect the conductivity characteristics of the rotor in extended periods of wear.

It will be understood that the invention may be modified in method and structural aspects within the scope of the appended claims.

I claim:

1. In a method of making an induction motor rotor of the squirrel cage type in which toothed laminations of material are arranged in stepped relation to form a cylindrical rotor body which presents spaced helical slots, and a secondary winding is located around the rotor body and in the helical slots, the steps which include mechanically forming a sheet of electrical conductor material to provide a secondary winding shell having spaced conductor bar elements of a thickness which exceeds the depth of the helical slots in the rotor body, and further having end ring sections whose outer edges are spaced apart a distance greater than the axial length of the cylindrical rotor body, subjecting the secondary winding shell to oppositely directed forces exerted along the end ring section to displace the conductor bars in a skewed position, locating the skewed secondary winding shell about the rotor body with the conductor bars extending into the bottoms of the helical slots and projecting outwardly beyond the periphery of the rotor body and with the end ring sections of the shell extending axially beyond the end faces of the cylindrical rotor body welding the meeting ends of the end ring sections together, then subjecting the projecting parts of conductor bars to pressure to flow conductor bar metal into the slots and around the stepped edges of the toothed laminates and in overlapping relationship with respect to adjacent surfaces of the laminates thereby to completely fill and overlie the slots at all points, and then removing excess conductor bar metal from the peripheral surface of the rotor body to expose the edges of the toothed laminates.

2. A method according to claim 1 in which the conductor bar metal is flowed by hammering forces exerted in oppositely opposed relationship all the way around the periphery of the winding shell.

3. A method according to claim 1 in which the end ring sections and the conductor bar portions projecting therefrom are displaced radially inwardly over the end faces of the rotor body to overlie the bottoms of the helical slots.

4. A method according to claim 1 in which the end ring sections are subjected to pressure forces exerted axially against opposite ends of the rotor body to flow the ring sections and adjacent conductor bar portions into locking ring parts whose inner peripheries are comprised by wedge shaped conductor bar portions.

5. In a method of making an induction motor rotor of the squirrel cage type in which toothed laminations of metal art arranged to form a rotor body with spaced helical slots therein, and a secondary winding is located around the rotor body and in the helical slots, the steps which include mechanically forming a sheet of electrical conductor material to provide a secondary winding shell having conductor bar elements of a thickness which exceeds the depth of the helical slots and end ring sections whose outer edges are spaced apart a distance greater than the axial length of the cylindrical rotor body, subjecting the secondary winding shell to oppositely directed forces exerted along the said end ring sections to arrange the conductor bar elements in a skewed position, moving the said rotor body into rolling contact with the skewed winding shell to engage the conductor bar elements in respective helical slots of the rotor body throughout the depth of said slots and thereby causing the shell to assume a cylindrical shape, then welding meeting points of the end ring sections together and then applying to the secondary winding shell periphery impact forces to flow intermediate portions of the conductor bars into the spaces in the helical slots thereby to increase the density of metal occurring in the slots, and simultaneously displacing the extremities of the conductor bar elements radially inwardly over the end faces of the rotor and beyond the bottoms of respective helical slots in said end faces, and then subjecting the end ring sections and radially displaced conductor bar portions to oppose axially directed forces to increase the radial width of the ring sections and form the displaced conductor bar portions into wedge shaped parts thereby to secure the rotor and conductor bar elements in solidly interlocked relationship.

References Cited

UNITED STATES PATENTS

| 3,189,984 | 6/1965 | Haifley et al. | 29—205 |
| 1,796,423 | 3/1931 | Apple | 29—598 |

JOHN F. CAMPBELL, *Primary Examiner.*

R. W. CHURCH, *Assistant Examiner.*